Aug. 12, 1930.　　　K. SUITSU　　　1,773,065

STAND FOR MOTOR CYCLES

Filed Aug. 12, 1929

Inventor:-
Kosaku Suitsu by
Langner, Parry, Card & Langner
Attys.

Patented Aug. 12, 1930

1,773,065

UNITED STATES PATENT OFFICE

KOSAKU SUITSU, OF KURUME, JAPAN

STAND FOR MOTOR CYCLES

Application filed August 12, 1929, Serial No. 385,240, and in Japan May 14, 1928.

This invention relates to improvements in a stand for motor-cycles. It consists of a case member made of sheet steel to be fixed to the frame of a motor-cycle, an L-shaped arm pivoted at one end in the case member and a coil spring which stretches itself between the arm and the case member so as to rest the rock arm only at two extreme positions beyond its dead centers. The object of this invention is to obtain a very simple and cheap stand with reliable functions.

Figure 1:
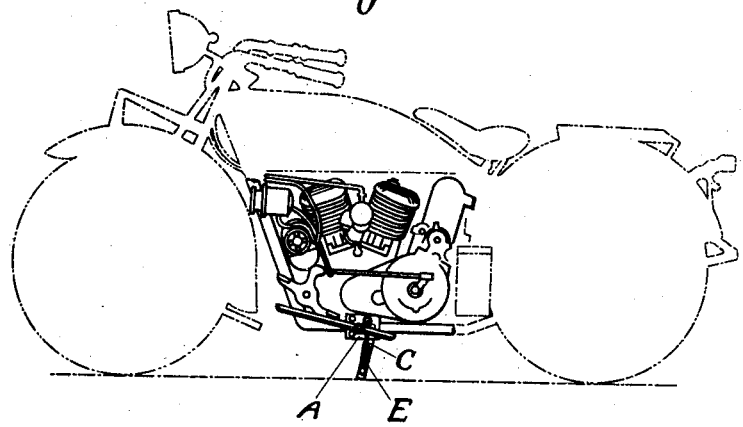

A stand according to this invention is illustrated in the accompanying drawings, in which Fig. 1 shows a side elevation of the stand fixed to a motor-cycle.

Figure 2:
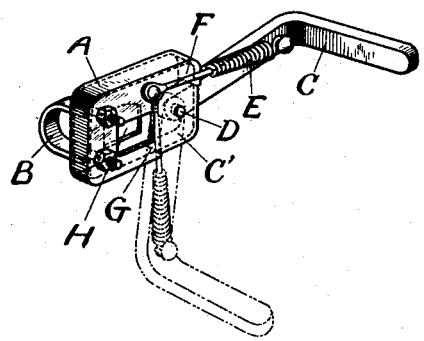

Fig. 2 is a perspective view of the stand proper in a larger scale.

Referring to the drawing, the stand consists of a case member A made of sheet steel which is to be fixed to the frame of a motor-cycle by way of an U-shaped bracket B. An L-shape arm C is pivoted on a stud D at its end in the case A, and extends out the case member through an opening $C^1$ made in a corner of the case member. A coil spring E stretches between the case member and the arm, and the fixed point of the spring E on the case member is located a little upwardly and inwardly from the position of the stud D. The arm C can be rocked up and down by the action of the spring E till the arm is prevented from further motion by edges F or G of the opening $C^1$, where the arm occupies a position beyond its dead centre. The arm can only rest in the extreme position but cannot rest at an intermediate position between the two.

A square hole H on the case member is provided to have an extended portion of the frame of the bicycle extend through when the stand is attached thereto.

According to this invention, the rock arm easily can be turned to the vertical position as shown dotted lines in Fig. 2 by the rider pressing the arm C with his foot when the arm is in the top or horizontal position as shown in full lines, and in the vertical position it can support the bicycle standing. When the bicycle is pushed forward a little, the arm turns at a small angle, and as soon as it gets beyond its dead center, the arm is suddenly pulled upward by the spring and takes another or horizontal position.

The construction of this stand is very simple, and can be attached to or removed from a bicycle very easily. The cost is very low.

What I claim is:—

A stand for motor-cycles comprising a casing with an opening at one corner, an L-shaped arm extending through the opening and having its inner end pivotally secured to the casing, a spring having one end secured to the casing and the other end secured to the arm so that the arm can only occupy either its extreme ends beyond dead centers, and an U-shaped bracket fixed to the casing for attaching the latter to the frame of a bicycle.

In testimony whereof I affix my signature.

KOSAKU SUITSU.